Patented Jan. 16, 1934

1,943,532

UNITED STATES PATENT OFFICE 1,943,532

SYNTHETIC INORGANIC GEL AND PROCESS FOR MAKING SAME

Charles S. Howe, Los Angeles, Calif., assignor to Los Angeles Testing Laboratory, Los Angeles, Calif., a corporation of California No Drawing. Application July 27, 1929
Serial No. 381,677

5 Claims. (Cl. 252—6)

This invention relates to improvements in inorganic gels and inorganic compositions and processes for making the same and refers more particularly to improved types of inorganic gels in which are included selected ingredients which have the qualities of gelatinizing the contained constituents.

It is a well known fact that certain naturally occurring materials and compositions have the property of forming a colloidal composition or gelatinizing with the addition of water. Among these materials are certain products such as bentonite or other hydrous aluminum silicates naturally occurring in Wyoming, North and South Dakota, Nevada, California, and elsewhere. It has been found that certain of these natural occurring hydrous aluminum silicates gelatinize with the addition of water, particularly some of the bentonite mined in Wyoming have this quality and form a thick jellied mixture with addition of as much as 2000% of water.

Heretofore to produce gel compositions it was necessary to rely primarily upon the naturally occurring products. As these products are limited in extent, and occur in small deposits ununiform in their gel characteristics, difficulty has been experienced in satisfying commercial demands.

It is the purpose of the present invention to disclose a composition and method by means of which practically all of the naturally occurring material which is incapable of forming a gel may be made to gel by the addition of water and selected materials which give the desired jellying effect.

It has been discovered that the combination of a soluble or a potentially reactive alkaline earth salt and a soluble or potentially reactive alkali salt in combination invariably produces a gel when water is added. In the producing of these gel forming combinations particular success has been had in the combination of an alkaline earth with a soluble or potentially soluble alkali silicate. Included in the alkaline earths are calcium, magnesium, strontium, and barium, and in the soluble or potentially soluble alkali salts are those of sodium, potassium and lithium.

In preparing the gel forming compositions, the alkaline earth salts and alkali salts are brought into reactive contact, under suitable conditions. Normally the addition of water brings about the desired effect. In connection with these gel forming combinations or compositions there may be added a filler material having the desired characteristics.

Where a material of fine grained characteristics is desired, a naturally occurring product, such as the hydrous aluminum silicates, will serve even though they do not normally have gel forming properties. Diatomaceous earth or diatomite, talc, barites, hematite, gypsum, silica, clay or argillaceous materials, including shale and kaolin, may also be used individually or in combination as filler materials, also other organic or inorganic fillers or addition products, including mineral or vegetable oils, bitumens and asphalts can be added and maintained in suspension.

It has been found that alkaline earth salts chemically combine with the soluble or potentially reactive alkali salts to form a gel composition, to which may be added any materials of the proper degree of fineness which are to be held in suspension.

In the drilling of oil wells it is desirable to maintain in suspension heavy mineral materials such as barites or hematite in order to prevent the escape of gas and to lubricate the bit in the drilling operation.

In the manufacture of asphalt or oil emulsions it is desirable to incorporate the hydrocarbon material into a permanent suspension and for this purpose the gel as produced by the combination of the alkaline earth salts and the soluble or potentially reactive alkali salts is admirably adapted. Further uses of the gel are found in the manufacture of paint, as an admixture for concrete cement mortars, cement lime mortars, stuccos, and in the production of calcareous plastics. It is also adaptable for use as a plasticizer of clay and calcareous and magnesium cements, and as an admixture to foundry sand and for any use where it is desirable to increase the plasticity of materials or to maintain in suspension a substance which has a tendency to settle out from the liquid in which it is suspended.

In certain naturally occurring materials or in certain manufactured products one or the other of the gel forming constituents is present in such form that when the other material is added the gelatinizing effect is produced. As an example of this, underburned Portland cement may contain calcium oxide or lime in uncombined form, in which condition it is potentially reactive. To this may be added soluble or potentially reactive salts such as sodium silicate and this combination immediately produces, with the addition of water, a jellied mass. An example of naturally occurring material which has one of the necessary ingredients in proper form to chemically combine with the other constituents to form the gel composition would be one of the non-gelatinizing bentonites which might contain appreciable amounts of a soluble silicate such as sodium and potassium silicate. Now by adding to non-gelatinizing bentonites of this character material such as calcium chloride or magnesium oxide there is produced, upon the addition of water, a gel comparable to the naturally occurring gelatinizing bentonite. In these non-gelatinizable bentonites, either or both of the necessary gel-forming constituents may be lacking.

Obviously, what constitutes the salient object of the present invention is the selecting of the active gel-forming materials and combining them to produce a synthetic gel combination. The selection and proportioning of these ingredients permits the production and manufacture of the composition according to the requirements for use.

A modification in the production of gel-forming compositions contemplated by the present invention consists in combining suitable materials in the dry or wet state and subjecting them to heat to form therein the gel producing ingredients. An example of this is the combination of cement, cement clinker, or Portland cement raw mix with salts of the alkali group, including sodium, potassium, etc., and heating this mixture to a temperature to allow a chemical reaction to take place which would produce the desirable gel forming characteristics in the finished products. It may be desirable in the production of materials of this type to have in the mix a small amount of carbonaceous material. This particular example contemplates the burning of alkaline or alkali materials with cement mixtures, either prior to the burning of cement clinker or subsequently thereto. The ultimate product has present in the cement gel-forming materials, in this case sodium silicate and reactive lime, either present or added.

These gel-forming combinations may also be produced by the calcination of non-gelatinizing bentonites, argillaceous or siliceous materials by the addition of sodium sulphate, sodium carbonate or any of the fusible alkali salts in combination with a soluble alkaline earth salt or oxide, such material and combinations producing a gel when mixed with water. Thus it will be seen that the gel-forming constituents are again the reactive alkali silicate and an alkaline earth salt.

It will be understood that the best results in forming a gel composition are produced by reducing the ingredients to a relatively fine state by grinding.

It is not essential that the lime or the alkaline earth salt be added at the time of calcination as the same results are obtained by its subsequent addition. In each example stated it will be recognized that the active materials which form the gel compositions are the reaction products of alkaline earth salts with soluble or potentially reactive alkali salts.

The meaning of "potentially reactive" throughout the specification is a condition of the material which lends itself to reaction. Such condition is exemplified by a naturally occurring bentonite which is of zeolitic character containing chemically combined lime and other alkaline earth metals which on the addition of such a substance as sodium chloride or common salt combines to form the sodium zeolite with the release of calcium or other alkaline earth metal to form a chloride.

The processes and compositions described will tolerate considerable variations in acidity and alkalinity and still maintain their gel-forming properties. The toleration on the acid side is considerably less than on the alkaline side.

The combination of the gel-forming materials is made in proportions or amounts for proper chemical combination. It is not, however, essential that these proportions follow exactly the law of definite proportions or the requirements for complete chemical reaction as an excess of either ingredient will not disturb or affect the ultimate product or gel. The consistency of the gel is controlled by suitable variations of the active gel-forming materials, also by regulating the proportion of the filler liquid, etc.

By the kiln burning processes explained, the invention also contemplates the use of any hydrous alumina, silicate, argillaceous, siliceous or diatomaceous substance in the place of cement or cement clinker in the production of gel-forming compositions. By this burning is made available for reaction soluble or potentially reactive silicates which produce a gel-forming composition with the subsequent addition of an alkaline earth salt.

Below is listed a summary of the alkaline earth salts and alkali salts used in the combination described heretofore. While this description is not inclusive of all the possible constituents which may be adaptable for the purposes described, it contemplates the essential ingredients which have been found adaptable for the gel-forming compositions.

| Alkaline earth salts | | Alkali salts | |
| --- | --- | --- | --- |
| Metallic radicals | Acid radicals | Metallic radicals | Acid radicals |
| Ca Sr Ba Mg | Oxides Hydroxides Sulphates Chlorides etc. | Na K Li | Silicates Phosphates Borates etc. |

It will be noted that the oxides of the metals are included as salts in the present invention.

The following are examples of typical combinations of minerals which have produced satisfactory gels by the combination of the materials hereinbefore described:

Example 1

Non-gelatinizing bentonite clay, containing a potentially reactive alkaline earth salt_____ 5.0 grams
Sodium silicate, 40% solution_____ 5 cc.
Water_____ 95 cc.

This mass set up in a manner superior to that of any natural bentonite.

Example 2

Portland cement, containing a potentially reactive alkaline earth salt____ 5.0 grams
Sodium silicate, 40% solution_____ 5 cc.
Water_____ 95 cc.

This mass set up in a manner even more satisfactory than the mixture with bentonite.

Example 3

| | |
|---|---|
| Portland cement, containing a potentially reactive alkaline earth salt | 2.5 grams |
| Fuller's earth filler | 2.5 grams |
| Sodium silicate, 40% solution | 5 cc. |
| Water | 95 cc. |

Example 4

| | |
|---|---|
| Hydrated dolomitic lime, containing a potentially reactive alkaline earth salt | 1.0 gram |
| Sodium silicate, 40% solution | 5 cc. |
| Water | 95 cc. |

Example 5

| | |
|---|---|
| Portland cement, containing a potentially reactive alkaline earth salt | 5.0 grams |
| Hydrated dolomitic lime, containing a potentially reactive alkaline earth salt | 0.1 gram |
| Sodium silicate, 40% solution | 5 cc. |
| Water | 95 cc. |

Example 6

| | |
|---|---|
| Portland cement, containing a potentially reactive alkaline earth salt | 5.0 grams |
| Potassium bisulphate (fused) | 0.1 gram |
| Sodium silicate, 40% solution | 5 cc. |
| Water | 95 cc. |

Example 7

| | |
|---|---|
| Diatomite (commercially sold as celite) | 5.0 grams |
| Water | 95 cc. |
| Sodium silicate, 40% solution | 5 cc. |
| Calcium hydroxide | 1.0 gram |

It will be noted that, among these examples, various combinations of Portland cement, sodium silicate, hydrated lime and a solid acid compound have been used. The purpose of the acid was to liberate the silica in a colloidal form from the sodium silicate or water glass, and to assist in the solution and rendering more active the alkaline earth.

These combinations are all highly gelatinizing and have better jelling qualities than the best natural bentonites tested. Another important advantage of preparing gels of this character synthetically is the ease with which the dry mass mixes with water. This advantage will be appreciated when certain of the bentonites have been used in this connection which oppose water combination. The dry mass used in the above examples immediately takes the added water, the gelatinizing property developing somewhat gradually. This gradual development of the gelatinizing is an important factor, particularly when such materials are used in oil wells for drilling purposes.

The process and composition cover the preparation and use of a synthetic gel or colloidal suspending agent using such common materials as Portland cement, hydrated lime, clay and acid preferably in solid form, together with a soluble silicate. This soluble silicate may also be produced through the action of acid or alkali on a relatively insoluble silicate.

I claim as my invention:

1. A method of making a viscous gel forming composition comprising the steps of adding a fusible alkali salt to an ordinary composition for making cement by calcination and subjecting the aggregate mass to calcination, said alkali salt being potentially reactive with said ordinary composition.

2. A method of producing a composition capable of forming a viscous gel with water comprising the steps of adding to a raw mix for cement manufacture a fusible alkali salt or alkaline earth salt and calcining, and adding to the calcined material a second composition, characterized by the final aggregate mass having an alkaline earth salt and an alkali salt potentially reactive upon one another, one of said salts being produced in the calcining step by reaction with one of said compositions.

3. A method of producing a composition of matter capable of forming a viscous gel with water comprising adding to a composition of Portland cement and an alkali silicate an acid salt which will liberate silica in a colloidal form and increase the solubility of the alkaline earth salt.

4. A method of producing a composition of matter capable of forming a viscous gel with water comprising adding to a composition of Portland cement and sodium silicate an acid salt which will liberate silica in a colloidal form and increase the solubility of the alkali earth salt.

5. A method of producing a composition of matter capable of forming a viscous gel with water, comprising the steps calcining Portland cement clinker with an alkali salt, at temperatures below the volatilizing temperature of said alkali salt, said alkali salt being potentially reactive with said cement to produce a suspensoid, and grinding the calcined mass.

CHARLES S. HOWE.